June 5, 1945.　　　C. H. GREENE　　　2,377,494
APPARATUS FOR DRAWING GLASS TUBING
Filed May 7, 1941
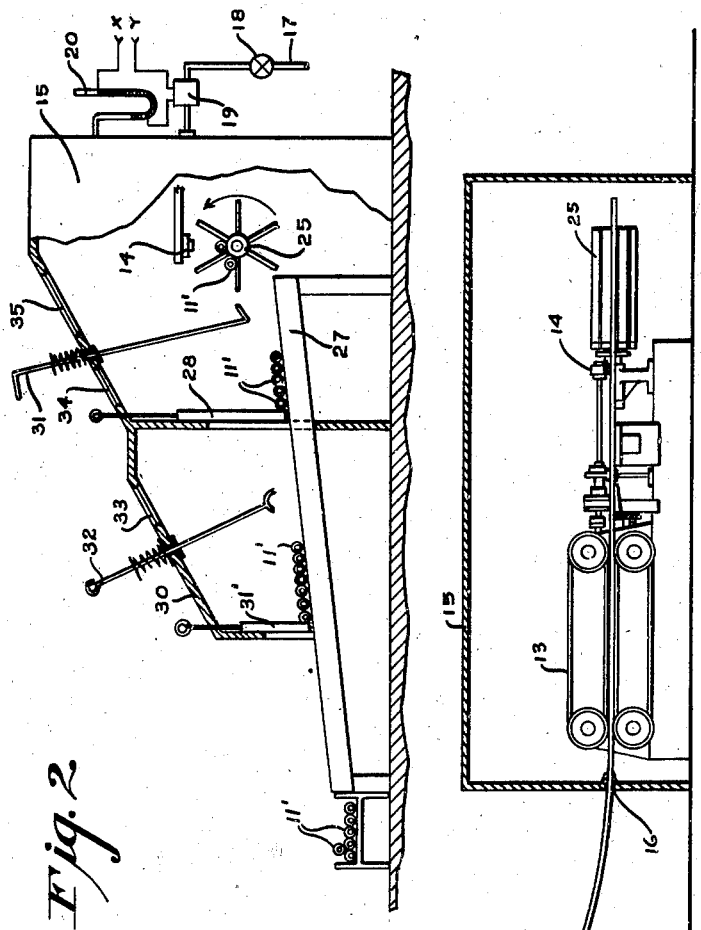
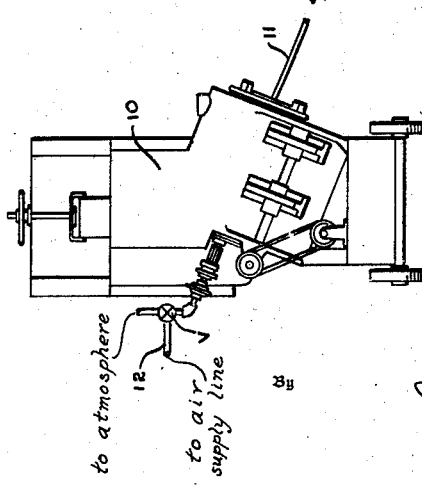
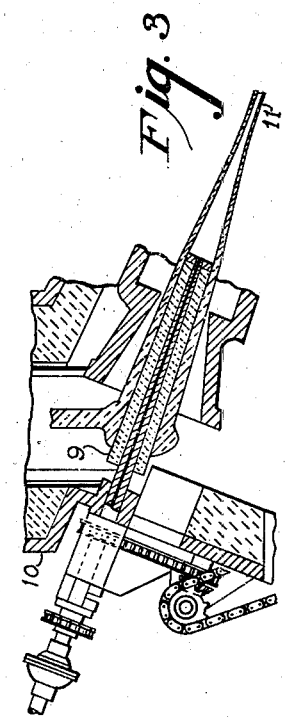
Inventor
CHARLES H. GREENE
Attorney Patented June 5, 1945

2,377,494

UNITED STATES PATENT OFFICE 2,377,494

APPARATUS FOR DRAWING GLASS TUBING

Charles H. Greene, Corning, N. Y., assignor to Corning Glass Works, Corning, N. Y., a corporation of New York Application May 7, 1941, Serial No. 392,378

9 Claims. (Cl. 49—17.1)

The present invention relates to apparatus for the continuous drawing of glass tubing, and is particularly concerned with the provision of a new and improved apparatus introducing a gaseous fluid into the tubing being drawn.

The most extensively used tube drawing machines are those of the general form shown and described in Danner patents, 1,219,709 and 1,220,201 and in Vello patents, 2,009,326 and 2,009,793. For the purpose of describing the present invention it has been herein applied to the type of machine disclosed by the Danner patents, although it is equally applicable to the Vello and other types of machines.

In a machine of the Danner type plastic glass is drawn off the end of a rotating tubular member referred to as a mandrel. This mandrel has an axial passage through which air is supplied to the unsupported end of the mandrel to produce a bore in the glass being drawn therefrom. The tubing after passing from the mandrel moves downwardly and then travels in a horizontal path on a runway of rollers by which it is supported while on its way to the location where it becomes fully set and is seized by the drawing and severing mechanisms, as fully explained in the above Danner patents. As will be readily understood, since the end of the tubing remote from the mandrel is open to the surrounding atmosphere a greater volume of air must always be supplied to the mandrel bore to maintain a desired cross-section of tube bore than would be necessary with the remote end of the tubing closed. This method of supplying air to the tubing therefore is more wasteful of air than in manual practice wherein all air introduced into the tubing remains therein until the drawing operation has been completed. Furthermore, in machine drawing of tubing, since the air supplied to the tubing first passes through the highly heated mandrel any sublimate from the hot glass being drawn therefrom is swept forward into the cooler tubing and condenses thereon. The impurities which are thus deposited on the inner surface of the tubing sometimes render the same unfit for some uses, for example in the manufacture of fluorescent lights. Also, it may be desirable to introduce gases into the tubing as it is being drawn, for example to improve the internal surface of the tube. The characteristics of such gases often preclude their being introduced into the plastic or hot end of the tubing.

One object of the present invention is an improved tube drawing apparatus.

Another object is an apparatus for supplying a gaseous fluid to tubing being drawn mechanically, closely simulating that followed in manual tube drawing practice.

A further object is a tube drawing apparatus wherein air or other gases may be introduced into the cooler end of the tubing being drawn.

A still further object is an apparatus suitable for use in practicing applicant's method.

Fig. 1 of the accompanying drawing illustrates a Danner tube drawing machine from which tubing is being drawn by a Danner drawing tractor and being cut into predetermined length tubes by a Danner cut-off machine arranged within a sealed chamber employed therewith in carrying out applicant's method; and Fig. 2 is a view illustrating one manner of removing sections of tubing from the sealed chamber.

Fig. 3 is an enlarged elevational view in section of a fragment of the drawing machine appearing in Fig. 1.

Tube drawing is initiated in the conventional manner, for example, as taught by Danner by initially supplying air to the glass 11 through the rotatable mandrel 9 of the machine 10 from a suitable supply line 12. The run of tubing 11 between the machine 10 and tractor 13 for drawing the tubing is supported on a system of rollers (not shown) as is the usual practice.

In the structure illustrated, however, the tractor 13 and cut-off equipment 14 are arranged within a pressure chamber 15 into which the tubing enters through a suitably bushed opening 16. A gas supply line 17 extending from a suitable supply source (not shown) is in communication with chamber 15 and contains a manually operable valve 18 and a magnetically operable valve 19. A manometer 20 in communication with the chamber 15 indicates the pressure within the chamber. This manometer also serves as a pressure control switch through which current is supplied from a source x—y to the valve 19 to maintain the supply line closed so long as a predetermined pressure exists within the chamber as determined by the manometer 20 and to allow the valve to open only when a further supply of gas to the chamber 15 is required to maintain the desired pressure in this chamber.

As clearly brought out in the previously referred to Danner Patent 1,220,201, the tubing 11 is severed into predetermined length tubes 11' by cut-off equipment 14 and dropped into a trough of a delivery wheel 25. In the structure illustrated the tubes 11' roll from the delivery wheel 25 onto an inclined support 27 where they are allowed to accumulate back of a gate 28 opening to a small chamber 30. Accumulations of tubes 11' in chamber 15 are periodically permitted to roll into chamber 30 by raising of gate 28. The accumulation of tubes 11' is periodically permitted to roll from chamber 30 by raising a gate 31'. Owing to the small capacity of chamber 30 compared to that of chamber 15, pressure in chamber 30 is reestablished after lowering gate 31' by leakage from chamber 15 without a harmful drop in pressure within chamber 15.

It may sometimes occur that tubes 11' require manual manipulation and with this in view tools 31 and 32 are provided enabling an attendant observing the tubes through suitable windows 33, 34 and 35, to shift the tubes 11' into proper alignment.

The tube drawing operation is initiated in the conventional manner, air being supplied to the mandrel from supply line 12, through the associated control valve V. After the drawing operation is progressing satisfactorily, valve 18 may be opened to build up a fluid pressure in chamber 15, the valve V being gradually closed as the pressure of the fluid supplied to the chamber and thus to the delivery end of the tube becomes high enough to maintain the unset portion of the tubing suitably expanded.

As will be clearly evident, the pressure maintained in chamber 15 may be such that valve V can remain closed under which circumstances a static gaseous condition will prevail in the tubing being drawn as is the case in manual practice. Alternatively, if desired, the valve V may be operated to connect the mandrel with atmosphere and fluid from the chamber 15 thus passed through the tubing and mandrel in the reverse direction to that followed in past practice.

The structure illustrated contemplates the use of some form of gas other than air. If air is to be employed as in common tube drawing practice, chamber 15 can be so enlarged that an attendant can remain in the chamber and by means of suitable valves control the atmospheric pressure therein as required for best operating performance.

I claim:

1. The combination with a tube drawing apparatus wherein tubing is continuously drawn from a gathering tool, of a chamber into which the drawn tubing enters, and means for maintaining a positive fluid pressure in said chamber and in the bore of the tubing entering it.

2. The combination with a tube drawing apparatus wherein tubing is continuously drawn from a gathering tool having a bore through which fluid may be supplied to the bore of the tubing being drawn at its end of formation, of means for severing sections of tubing from the free end thereof, an enclosure in which the free end of the tubing is confined, and means for maintaining a positive fluid pressure within said enclosure and hence in the bore of the tubing entering it.

3. The combination with a glass working apparatus wherein a rotatable member is supplied intermediate its ends with molten glass and wherein glass is drawn from one end of the member in the form of tubing, of means for severing sections of tubing from the free end thereof and of fluid pressure apparatus associated with the free end of the tubing for maintaining a static and positive fluid pressure within the bore of the tubing while the severing operation is occurring.

4. The combination with an apparatus wherein plastic glass is caused to flow continuously towards one end of a gathering device having a bore through which fluid may be supplied to form a bore in the drawn glass and wherein the glass is drawn and cut into predetermined lengths by suitable traction and cut-off equipment, of an enclosure for the cut-off equipment having an aperture through which the tubing enters such enclosure, means for sealing the space between the enclosure and tubing passing therethrough, and means for maintaining pressure within said enclosure.

5. In a glass drawing apparatus, means for maintaining a constant predetermined static fluid pressure in the tubing as it is being drawn, said means comprising a sealed chamber into which the tubing projects and facilities for maintaining a predetermined fluid pressure within the chamber in accordance with that to be maintained in the bore of the tubing entering it and means within said chamber for severing the tubing entering it into sections.

6. The combination of a glass tube former, of a drawing apparatus arranged to apply a drawing tension to tubing produced by the former, mechanism associated with said drawing apparatus for cutting the drawn glass into predetermined lengths, a walled enclosure for said mechanism having an aperture through one wall thereof through which the tubing enters, a gasket arranged to prevent passage of fluid out of the enclosure around the tubing and means for maintaining a predetermined fluid pressure within said enclosure.

7. A glass tube drawing apparatus, a chamber into which drawn tubing is delivered, means within said chamber for severing the tubing into tubes of predetermined lengths, means for maintaining positive pressure in said chamber, and means enabling the removal of such tubes from said chamber while maintaining a positive pressure therein.

8. A glass tube drawing apparatus which includes a chamber having associated means for maintaining a positive pressure therein and into which tubing is delivered and severed into tubes of predetermined length, a second chamber having positive pressure maintained therein by fluid supplied from said first chamber, a gate between said chambers to release tubes within said first chamber into said second chamber, and a gate for releasing tubes from said second chamber.

9. A glass working apparatus which includes a chamber having a wall aperture closed to atmosphere by tubing passing therethrough still connected with a supply body of glass from which it is being formed, means within said chamber for severing the tubing entering it into sections, and means for supplying fluid to said chamber to maintain a pressure therein and in the tubing.

CHARLES H. GREENE.